(12) United States Patent
Dembeck

(10) Patent No.: US 8,800,707 B1
(45) Date of Patent: Aug. 12, 2014

(54) MODULAR SYSTEM AND METHODS FOR MOVING LARGE HEAVY OBJECTS

(75) Inventor: David M. Dembeck, Puyallup, WA (US)

(73) Assignee: The Boeing Company, Chicago, IL (US)

( * ) Notice: Subject to any disclaimer, the term of this patent is extended or adjusted under 35 U.S.C. 154(b) by 272 days.

(21) Appl. No.: 13/215,297

(22) Filed: Aug. 23, 2011

(51) Int. Cl.
*B60V 3/02* (2006.01)
*B60V 1/16* (2006.01)
*B65G 7/06* (2006.01)

(52) U.S. Cl.
CPC . *B60V 3/025* (2013.01); *B60V 1/16* (2013.01); *B65G 7/06* (2013.01)
USPC ............................. 180/125; 180/124; 180/127

(58) Field of Classification Search
USPC .................. 180/124–127; 414/676, 806, 809
See application file for complete search history.

(56) References Cited

U.S. PATENT DOCUMENTS

| | | | | |
|---|---|---|---|---|
| 2,938,590 A * | 5/1960 | Barnett | ......................... | 180/125 |
| 3,161,247 A * | 12/1964 | Mackie | ......................... | 180/124 |
| 3,185,238 A * | 5/1965 | Coates | ......................... | 180/125 |
| 3,237,708 A * | 3/1966 | Strasser et al. | ................ | 180/121 |
| 3,253,665 A * | 5/1966 | Schienle | ......................... | 180/164 |
| 3,260,322 A * | 7/1966 | Mackie | ......................... | 180/124 |
| 3,392,800 A * | 7/1968 | Swamy | ......................... | 180/125 |
| 3,466,010 A * | 9/1969 | Jung | ......................... | 254/93 R |
| 3,513,934 A | 5/1970 | Crowley | | |
| 3,613,821 A * | 10/1971 | Kerr et al. | ..................... | 180/125 |
| 3,662,906 A * | 5/1972 | Christensen | ................. | 414/390 |
| 3,677,361 A * | 7/1972 | Bertin | ......................... | 180/127 |
| 3,713,507 A * | 1/1973 | Bertin et al. | ................... | 180/127 |
| 3,756,342 A * | 9/1973 | Burdick | ......................... | 180/124 |
| 3,779,334 A * | 12/1973 | Eggington | ..................... | 180/121 |
| 3,796,279 A * | 3/1974 | Burdick et al. | ................ | 180/124 |
| 3,807,035 A * | 4/1974 | Moorman et al. | ............... | 29/563 |
| 3,822,761 A * | 7/1974 | Vaughen | ....................... | 180/121 |
| 3,825,094 A * | 7/1974 | Burdick | ......................... | 180/125 |
| 3,841,719 A * | 10/1974 | Smith | ............................ | 384/12 |
| 4,014,576 A * | 3/1977 | Druschel et al. | ................ | 406/38 |
| 4,155,421 A | 5/1979 | Johnson et al. | | |
| 4,359,309 A * | 11/1982 | Bergman | ...................... | 414/800 |
| 4,431,368 A * | 2/1984 | Katz et al. | ..................... | 414/809 |
| 4,470,578 A * | 9/1984 | Arvidsson et al. | ............ | 254/2 C |
| 4,664,584 A * | 5/1987 | Braun et al. | .................... | 414/541 |
| 4,843,969 A * | 7/1989 | Chaffee et al. | ................ | 104/23.2 |
| 4,905,781 A * | 3/1990 | Gilbert et al. | ................. | 180/127 |
| 5,087,280 A * | 2/1992 | Fuchigami | ...................... | 65/171 |
| 5,275,290 A * | 1/1994 | Bierfreund | .................... | 206/522 |

(Continued)

*Primary Examiner* — Anne Marie Boehler
*Assistant Examiner* — Maurice Williams
(74) *Attorney, Agent, or Firm* — Ostrager Chong Flaherty & Broitman P.C.

(57) ABSTRACT

A modular system that provides multiple support surfaces for a large heavy object and enables movement of that object with no friction (e.g., on a cushion of air). Each module has an object support surface and a bearing that enables the modules and the heavy object being supported thereby to be moved across a floor with no friction. Each module restrains a portion of the object on top within a frame that opens to allow the supported portion of the object to move off the support surface of the module and onto a stationary object support structure (e.g., a milling machine bed), using a cushion of air at an elevated height from the floor equal to that of the top surface of each module. The modules can be used independently or locked together to move a very large and heavy object or can be used to build a type of bridge which the air bearings underneath the object can cross.

7 Claims, 6 Drawing Sheets

(56) References Cited

U.S. PATENT DOCUMENTS

| | | | | |
|---|---|---|---|---|
| 5,328,038 A * | 7/1994 | Allen | | 211/151 |
| 5,452,983 A * | 9/1995 | Parmley, Sr. | | 414/345 |
| 5,456,556 A | 10/1995 | Petrovic | | |
| 5,683,221 A * | 11/1997 | Ablabutyan | | 414/540 |
| 5,725,347 A * | 3/1998 | Hansen | | 414/226.03 |
| 5,819,943 A * | 10/1998 | Depuy | | 206/522 |
| 6,039,527 A * | 3/2000 | Myllari | | 414/491 |
| 6,309,289 B1 * | 10/2001 | Dugger et al. | | 451/388 |
| 6,655,904 B2 * | 12/2003 | Landoll et al. | | 414/812 |
| 6,676,365 B2 * | 1/2004 | Adam et al. | | 406/83 |
| 6,990,715 B2 * | 1/2006 | Liu et al. | | 29/428 |
| 7,156,603 B2 * | 1/2007 | Marcotte | | 414/339 |
| 7,168,369 B2 | 1/2007 | Bocquet et al. | | |
| 7,426,974 B1 | 9/2008 | Yeghiayan et al. | | |
| 7,604,439 B2 * | 10/2009 | Yassour et al. | | 406/88 |
| 7,993,081 B2 * | 8/2011 | Iida | | 406/88 |
| 8,246,706 B2 * | 8/2012 | Scarleski | | 55/488 |
| 8,256,541 B2 * | 9/2012 | Park | | 180/9.22 |

\* cited by examiner

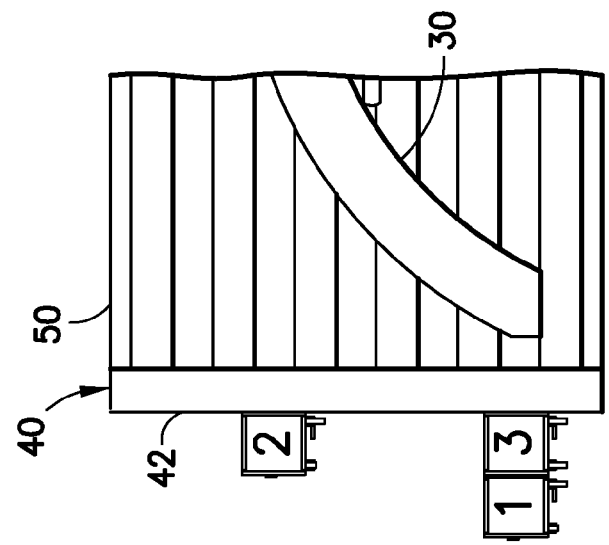
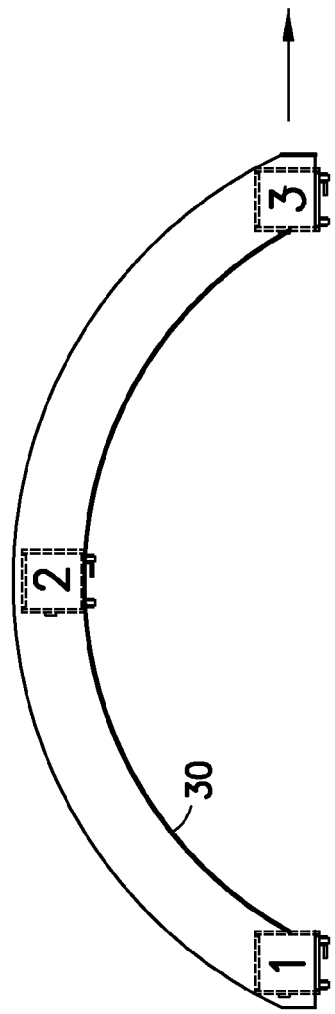

MODULAR SYSTEM AND METHODS FOR MOVING LARGE HEAVY OBJECTS

BACKGROUND

The embodiments disclosed hereinafter generally relate to systems and methods for loading large heavy objects onto elevated surfaces and, conversely, unloading such objects from the same surfaces. In particular, the embodiments disclosed hereinafter relate to systems and methods for loading heavy tooling onto machine beds.

Large and heavy objects (such as milling tools) need to be supported so that a worker has full access to the object at an ergonomic height and so that the supported object can be moved (e.g., to a milling machine). More specifically, the object needs to be transferred onto a machine (or station) that is at an elevated height from the floor. Furthermore, it is preferable that the large heavy object be easily and safely movable by a single operator.

To build unique carts for each unique object shape is an expensive and inefficient solution to this problem. In addition, objects in work must be lifted by crane or other heavy lifting devices and set on stands or carts, and then lifted again onto the machine surface and back again when the task is complete. This requires expensive equipment, additional trained workers and large costs. Conveyors and carts do not give workers access to the objects or the necessary mobility.

There is a need for improvements in systems and methods for moving large heavy objects onto an elevated surface of an object support structure.

SUMMARY

As used herein, the term "friction" refers to a force that opposes the relative motion of two material surfaces that are in contact in the narrow sense of touching, not in the broader sense of "interacting", e.g., by way of a cushion of air. Therefore the phrase "without friction", as used herein, is descriptive of, but not limited to, the effect produced by a cushion of air, e.g., produced by an air bearing.

The systems and methods disclosed hereinafter utilize a plurality of mobile supports placed on a floor and arranged to support a large heavy object (straight or curved) at an elevation above the floor. Each mobile support may consist of a single mobile support module or a stack of two or more mobile support modules. Each module has an object support surface and a bearing that enables the modules and the heavy object being supported thereby to be moved across a floor without friction. In particular, the system is designed to allow a single operator to move the fully supported heavy object. The preferred bearings incorporated in the modules are air bearings.

In accordance with the embodiments disclosed herein, a modular system provides multiple support surfaces for a large heavy object and enables movement of that object without friction (e.g., on a cushion of air). In addition to the previously described bearings under each module, the module-supported object also has air bearings. The top of each module or stack of modules restrains a respective object-supporting air bearing within a frame. During movement of the modular system, the air bearings under the object are de-activated. To facilitate unloading of the object, the air bearings under the object adjacent to the stationary object support structure (e.g., a milling machine bed) are activated and the top frames of the modules or module stacks confronting the activated bearings of the object are opened to allow that portion of the object to move off of the supporting top surface of the module and onto the object support structure at an elevated height from the floor equal to that of the top surface of each module or module stack. The modules or module stacks can be used independently or locked together to move a very large and heavy object or can be used to build a type of bridge which the object can cross.

Various embodiments disclosed herein provide a common modular work platform to support the various sizes and shapes of objects (such as production tools) either individually, using several modules spaced apart, or as a connected group of modules latched or otherwise interlocked together. In accordance with various embodiment, the objects supported preferably have the same bottom design as the modules (or use "adaptor pads") that interface with the tops of the modules, reducing additional design requirements. Air cushions provide a frictionless way to move a work object to another location and to move the work object on/off the modules. Simple latches open (i.e., lower) and close (i.e., raise) opposing gates of a frame that surrounds the top surface of each module to prevent the object from moving off the top surface of the module. When the gates are open, an air bearing of the work object can travel freely across the top surfaces of the module and the lowered gate, allowing the module to act as a bridge. Self-latching mechanisms internal to the modules can be used to securely lock the modules to a stationary object support structure having an elevated platform surface or to other modules. Modules with open gates can be locked together to form a type of bridge that the object can cross without obstacles. Side rails are provided on the module to prevent the object from moving sideways and off of the module during unloading.

In accordance with particular embodiments, upper air bearings mounted to the object being moved would be turned off during transport as they are not needed. This allows friction between the contacting surfaces of the object and module to prevent independent movements. In addition, the upper air bearings of the object are mounted in a frame, which frame fits into the frame (e.g., formed by gates and side rails) on top of any module and also restricts the object from excessive movement relative to the module. The lower air bearings which are mounted to the bottom of the modules may be provided with frames having the same configuration. This allows the modules to be stacked in the same way. The frame that holds the air bearing itself is used to support the object as the modules are sitting on the floor or may be machined to accurately support the object on a machine bed. The modules do not need to be as tall as the height of the machine bed, but rather could be made to stack for various heights as needed.

One aspect of the invention is a mobile support module comprising a bottom portion, an intermediate portion supported by the bottom portion, and a top portion supported by the intermediate portion, the bottom portion comprising a bearing that allows module movement in any direction, and the top portion comprising a support surface having an elevation and an object stop having extended and retracted positions, wherein the object stop projects to an elevation higher than the support surface elevation when the object stop is in the extended position, but does not project to an elevation higher than the support surface elevation when the object stop is in the retracted position.

Another aspect of the invention is a system comprising a plurality of mobile support modules and an object fully supported by the plurality of mobile support modules, wherein each module comprises a bottom portion, an intermediate portion supported by the bottom portion, and a top portion supported by the intermediate portion, the bottom portion comprising a bearing that allows module movement in any direction, and the top portion comprising a support surface having an elevation, and wherein the object comprises a plurality of bearings, each of the bearings of the object being disposed between a respective portion of the object and a respective support surface of a respective one of the plurality of mobile support modules.

A further aspect of the invention is a method for moving an object having a plurality of air bearings on a bottom portion thereof onto an object support structure set on a floor, the object support structure being designed to support the object at an elevation higher than the elevation of the floor, the method comprising: (a) placing a plurality of mobile support modules or a plurality of stacks of mobile support modules on the floor, each mobile support module comprising an air bearing on a bottom portion thereof; (b) arranging the object and the mobile support modules so that the object sits on top of and is fully supported by the plurality of mobile support modules, the heights of the mobile support modules or stacks thereof being such that the object is supported at an elevation whereat the bottom portion of the object is generally vertically aligned with a support surface of the object support structure, and the mobile support modules being positioned underneath the air bearings on the bottom portion of the object; (c) moving the plurality of mobile support modules along the floor until a first mobile support module is adjacent to a first portion of the object support structure; (d) latching the first mobile support module to the object support structure; (e) activating the air bearing on the bottom portion of the object that has the first mobile support module underneath it; and (f) moving the mobile support modules which are not adjacent to the object support structure further along the floor until a second mobile support module is adjacent to a second portion of the object support structure or is adjacent to the first mobile support module, the activated air bearing on the bottom portion of the object being moved onto the object support structure as the object is moved along with the further moved mobile support modules.

Other aspects of the invention are disclosed and claimed below.

BRIEF DESCRIPTION OF THE DRAWINGS

Various embodiments will be hereinafter described with reference to drawings for the purpose of illustrating the foregoing and other aspects of the invention.

FIGS. 6A and 6B are diagrams showing the initial and final positions respectively of three mobile support modules. In their initial positions (FIG. 6A), the modules fully support the curved tool sub-base as depicted in FIG. 4. In their final positions (FIG. 6B), the modules are docked and no longer support the curved tool sub-base, which has been moved onto the machine bed as depicted in FIG. 5.

Reference will hereinafter be made to the drawings in which similar elements in different drawings bear the same reference numerals.

DETAILED DESCRIPTION

The system disclosed herein employs a plurality of mobile support modules to support and move large heavy objects having different shapes. Preferably the modules share the same structure and are provided with the same hardware, for example, latches, levers, gates, air bearings, bearing frames and ports for coupling to air hoses. In accordance with some embodiments, these modules can be arranged to support curved and straight objects, as well as objects having more complex shapes. The object can be supported by either a plurality of single modules or a plurality of stacked modules (each stack comprising two or more modules). For the sake of interchangeability, the stacked modules preferably have the same structure and components. Alternatively, two types of modules can be provided, modules with air bearings and modules without air bearings, with the former serving as the bottom module of each stack and the latter serving as the modules stacked on top of the bottom module.

Figure 1:
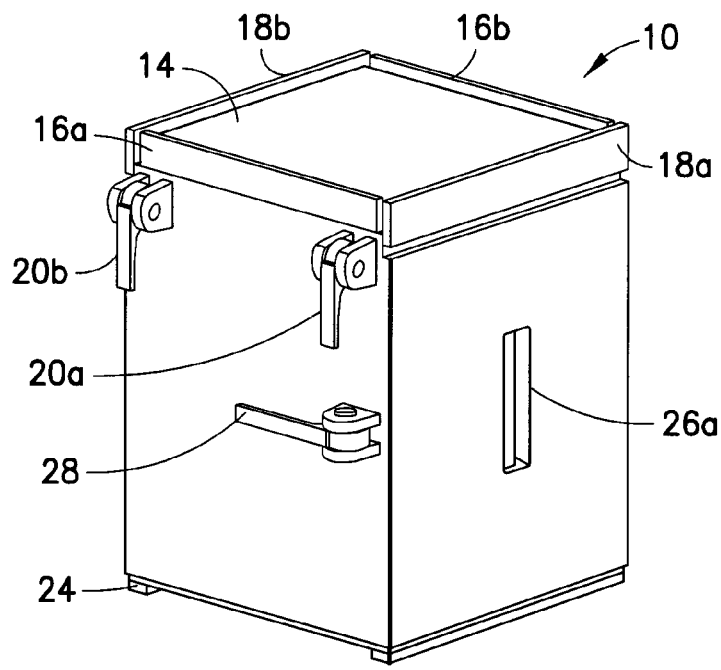
FIGS. 1 and 2 are diagrams showing isometric top and bottom views respectively of a mobile support module in accordance with one embodiment.
Figure 2:
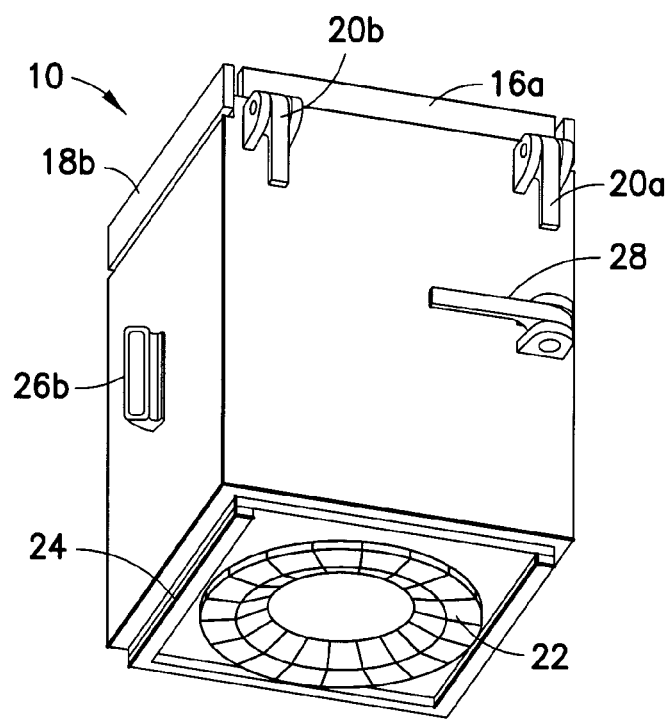

A mobile support module 10 having an air bearing 12 is shown in FIGS. 1 and 2 (isometric top and bottom views respectively). Module 10 comprises a cube- or box-shaped structure having bottom, intermediate and top portions. The top portion is supported by the bottom portion via the intermediate portion, which is made of sufficiently strong structural material to support a proportionate share of the total weight of the object to be supported and carried.

The air bearing 12 can be any one of a multitude of commercially available air bearings. For example, one known air bearing comprises an inflatable bag that surrounds a thin metal plate which can be slid into a receiving slot of a three-sided air bearing frame. The inflatable bag has one or more holes and receives pressurized air, thereby blowing air out of the hole or holes to create a cushion of air between the inflated bag and the supporting surface.

As seen in FIG. 1, the top of module 10 comprises a flat support surface 14 (hereinafter "support surface") having a square or rectangular shape. The support surface 14 is surrounded by a frame consisting of two opposing side rails 16a, 16b and two opposing gates 18a, 18b, each of these side rails and gates being disposed adjacent to a respective edge of support surface 14. As will be explained later, these side rails and gates serve as barriers or stops for blocking displacement of a bearing frame of the large heavy object being partly supported by support surface 14. The side rails 16a, 16b are fixed, while either of gates 18*a*, 18*b* can be independently raised or lowered. In the particular embodiment shown in FIGS. 1 and 2, the positions of gates 18*a*, 18*b* are controlled by manual operation of respective levers 20*a*, 20*b*.

FIG. 1 shows the gates on their extended positions, blocking object displacement. Each of gates 18*a*, 18*b* projects to an elevation higher than the support surface elevation when the gate is in its raised (blocking) position, but does not project to an elevation higher than the support surface elevation when the gate is in its lowered position. When the opposing gates 18*a*, 18*b* are lowered, an air bearing (of the object) therebetween is no longer blocked by those gates from displacing in the direction transverse to the gates. For example, if the edge of support surface 14 which is adjacent to gate 18*a* were placed next to the top surface of a stationary object support structure (not shown in FIGS. 1 and 2), the lowering of gate 18*a* would allow the unobstructed movement of an air bearing of the object, traversing the top surface of the lowered gate starting from a position atop the mobile support module and ending at a position atop the stationary object support structure.

In accordance with a further example, if the edge of support surface 14 which is adjacent to gate 18*a* of a first module were placed next to the top surface of a stationary object support structure, and further if the top support surface of a second module (not shown in FIGS. 1 and 2, but having the same structure as module 10) were placed next to the edge of support surface 14 of module 10 that is adjacent to gate 18*b* of module 10, the lowering of gates 18*a*, 18*b* of module 10 would allow the unobstructed movement of an air bearing of the object from a position atop the second module to a position atop the stationary object support structure by crossing the support surface 14 of module 10 (and the top surfaces of the lowered gates).

As seen in FIG. 2, the bottom of module 10 comprises an air bearing 22 that enables module movement across a surface without friction when the bearing is activated, and a machined air bearing frame 24 that supports module 10 on a surface when bearing 22 is de-activated. FIG. 2 shows three sides of an air bearing frame that has had its fourth side removed. The fourth side is removable to facilitate replacement of the removable air bearing. Air bearing frame 24 provides required base support, overall height adjustment and inflation lift height. The air bearing and frame depicted in FIG. 2 are the same as those on the bottom of the object being transported, i.e., the bearing frames have the same size and shape for both modules and objects.

Figure 10:
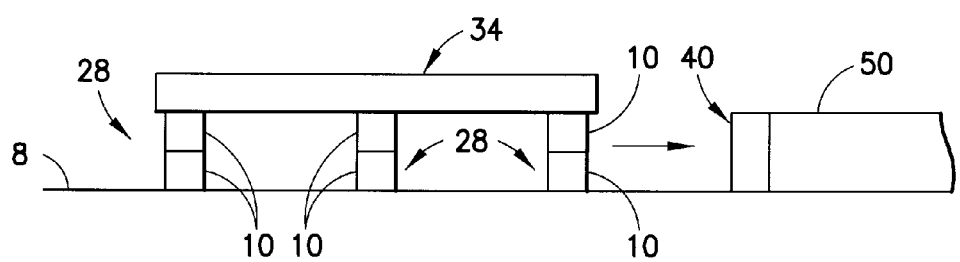
FIG. 10 is a diagram showing an object supported by a plurality of stacks of mobile support modules in accordance with a further embodiment.

In the particular implementation depicted in FIG. 2, the bearing frame 24 has nearly the same shape as that of top support surface 14 (i.e., square or rectangular), the bearing frame 24 being sized to fit between the side rails and gates of an identical module were module 10 to be stacked atop that identical module. In other words, the air bearing frame of one module is designed to nest inside the upper frame of another module on which it is stacked. Thus, if module 10 were stacked atop a second module, the side rails and gates (the gates being in their extended positions) of the latter would block displacement of module 10 relative to the second module in a plane parallel to the floor that supports the second module. The use of stacked modules to support and carry a large heavy object is shown in FIG. 10, described later.

Referring now to both FIGS. 1 and 2, each module 10 is further provided with a mechanism for latching or attaching module 10 to a stationary fixture or to an identical mobile support module. The particular module embodiment depicted in FIGS. 1 and 2 has a lock-receiving slot 26*a* formed in one side wall and a lock 26*b* projecting from an opposing sidewall. The lock 26*b* of one module can be inserted in the lock-receiving slot 26*a* of an adjacent module. In one exemplary embodiment, the internal mechanism inside the module and behind the slot is self-latching. Although not shown in FIGS. 1 and 2, various structures of latching mechanisms suitable for latching lock 26*b* and thereby locking two adjacent modules together are well known in the art. For example, one suitable latching mechanism comprises a spring-loaded (i.e., self-latching) latch, connected to one end of a release cable, which is mounted inside the module, the tip of the latch being shaped to engage a cutout in the aforementioned lock in order to lock the adjacent modules together. The other end of the release cable (which reverses itself as it passes around a pulley) is connected to a cam latch release lever 28, seen in FIGS. 1 and 2. Thus two adjacent modules can be locked together by inserting the lock of one into the lock-receiving slot of another. The modules can be unlocked by manually operating lever 28 of the latter module. The height of the lock is less than the height of the lock-receiving slot to allow for up/down travel of one relative to the other during inflation or deflation of a module air bearing.

The top surface 14 of the module 10 is parallel to the bottom air bearing frame 24 to provide a stable tool stand. The top surface is surrounded by a frame (i.e., side rail 16*a*, 16*b* and gates 18*a*, 18*b*) that restricts movement of an air bearing frame of the object) nested therein, but opens to allow an air bearing of the object to move across the support surface. An air supply connection (not shown in FIGS. 1 and 2) is on the back side of the module and feeds the air bearing 22 on the bottom to give frictionless mobility to heavy objects such as tooling. Air hoses (not shown in the drawings) connect on the backs of the modules and feed through to downstream modules, thereby providing pressurized air from a single source to the air bearings of a plurality of modules connected in series. The number of modules depends on the weight and shape of the object supported. For example, an operator may elect to use five modules to support an S-shaped object.

One practical application of modules of the type depicted in FIGS. 1 and 2 will now be described with reference to FIGS. 3-5. In this application, a plurality of modules (or a plurality of stacks of two or more modules) are used to move tooling onto an elevated bed of a milling machine. For example, the heavy object being moved can be milling fixtures mounted on a tool sub-base which must be loaded on a machine bed. The following description will not be limited to any particular tooling mounted on the tool sub-base.

Figure 3:
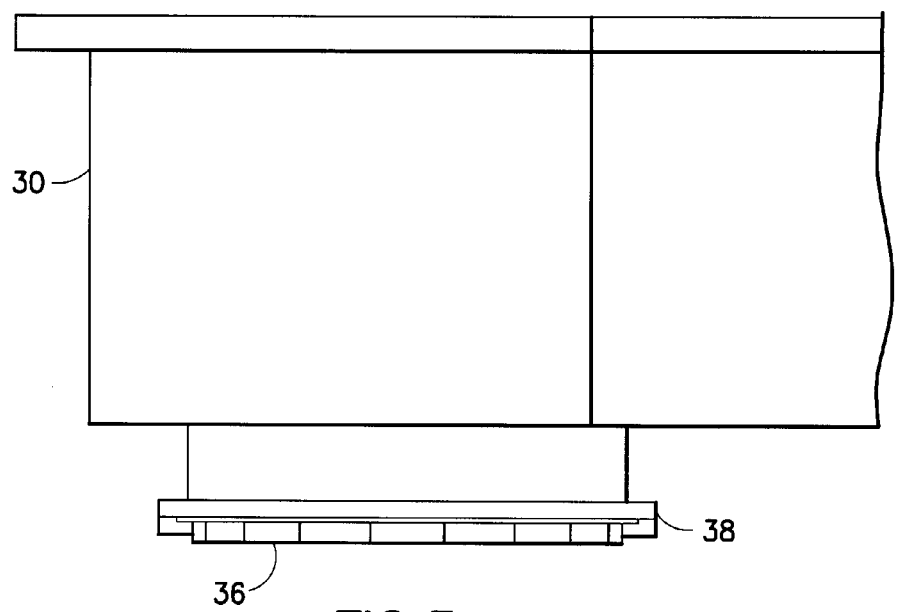
FIG. 3 is a diagram showing a front view of a portion of a tooling assembly of a type which can be transported using modules of the type depicted in FIGS. 1 and 2.

FIG. 3 shows a front view of a portion of a tool sub-base 30. As seen in FIGS. 4 and 5, the tool sub-base 30 is curved. FIG. 4 shows the curved tooling being supported at an elevation (equal to the elevation of the machine bed 50 seen in FIG. 5) by three mobile support modules 10 of the type depicted in FIGS. 1 and 2. FIG. 5 shows the curved tool sub-base 30 being supported by elevated machine bed 50. In general, curved tooling is preferably supported by three or more modules, whereas straight tooling can be supported by as few as one module, the number of modules in either case being dependent on the weight and shape of the tooling.

Referring again to FIG. 3, a plurality of air bearings are mounted to the bottom of the tool sub-base 30, the number air bearings being equal to the number of modules (or stacks thereof) supporting the tooling. Only one air bearing 36 is shown in FIG. 3. Air bearing preferably has the same structure as the module air bearing previously described, i.e., an inflatable bag with holes. The multiple air bearings mounted to the tool sub-base bottom enable movement across a flat surface with no friction when the air bearings are activated. FIG. 3 shows air bearing 36 in an inflated state. Some of the pressurized air is allowed to escape via one or more holes to create an air cushion between the inflated bag and the underlying module support surface. The air bearings on the bottom of the tool sub-base can be connected to a source of pressurized air via air hoses (not shown). The tool sub-base 30 further comprises a plurality of bearing frames that support the tooling assembly 30 on respective module support surfaces (not shown in FIG. 3, but see FIG. 1) when the air bearings are de-activated, i.e., deflated. Only one bearing frame 38 (with one of four sides removed) is shown in FIG. 3. Each bearing frame surrounds a respective air bearing. The bearing frames on the bottom of the tooling and the support surfaces of the modules have similar sizes and shapes. Preferably, the bearing frame 38 seen in FIG. 3 can nest inside the module upper frame formed by side rails 16a, 16b and gates 18a, 18b seen in FIG. 1. Thus, when bearing frame 38 (see FIG. 3) is sitting on the top support surface 14 of a module (see FIG. 1), the side rails 16a, 16b and gates 18a, 18b adjacent the edges of that top surface will block sideways displacement of the tooling relative to the module support surface.

Figure 4:
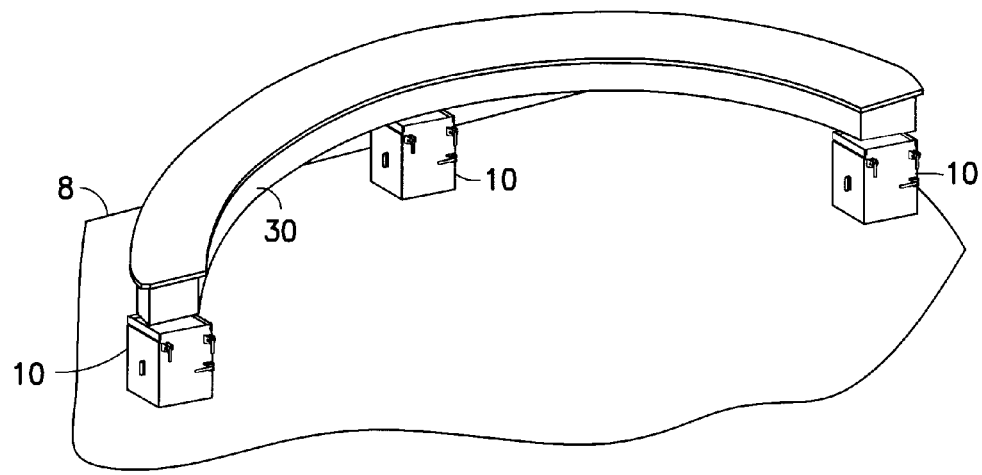
FIG. 4 is a diagram showing an isometric view of the curved tool sub-base depicted in FIG. 3 supported at an elevation by three mobile support module of the type depicted in FIGS. 1 and 2.
Figure 5:
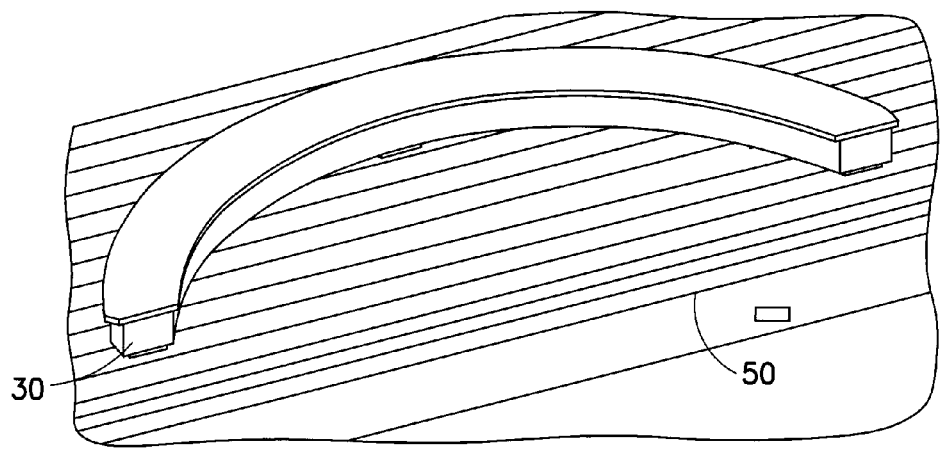
FIG. 5 is a diagram showing an isometric view of the curved tool sub-base depicted in FIG. 3 supported by a machine bed.

The method by which tool sub-base 30 is transferred from a position on top of three modules 10 supported on a floor 8 (as seen in FIG. 4) to a position on top of the machine bed 50 (as seen in FIG. 5) will now be described with reference to FIGS. 6A and 6B. For the purpose of this discussion, the three mobile support modules will be referred to as Modules Nos. 1, 2 and 3. In their initial positions (see FIG. 6A), Modules Nos. 1, 2 and 3 fully support the curved tool sub-base 30. In their final positions (see FIG. 6B), Modules Nos. 1, 2 and 3 are docked and no longer support the curved tool sub-base 30, which is shown in FIG. 6B atop a machine bed 50. It will be assumed for the purpose of this example that the tool sub-base 30 supports numerically controlled milling fixtures (not shown) which need to be transferred onto a surface of a bed 50 of a milling machine that has a structural tank 40.

During fixture load/unload (onto the tool sub-base) and part inspection, the tool sub-base 30 is supported by Modules Nos. 1, 2 and 3 (as seen in FIG. 6A) while the supplies of pressurized air to the air bearings under both the modules and the tool sub-base are turned off. To move the loaded tool sub-base, air is supplied to the air bearings of Modules Nos. 1, 2 and 3. (The air bearings of the tool sub-base 30 remain off.) The resulting air cushions under the modules enable an operator to move the tool sub-base 30 across a floor without friction. The tool sub-base can be moved in a manner that brings Module No. 3 to a position adjacent to the structural tank 40 of the milling machine (seen in FIG. 6B). The direction of movement (i.e., toward machine bed depicted in FIG. 6B) is indicated by the arrow in FIG. 6A.

After this first movement, Module No. 3 is securely latched to the wall 42 of the structural tank 40, as seen in FIG. 6B. Preferably the tank wall 42 has at least first and second locks 46 and 48 projecting therefrom at the same height as the lock-receiving slots on the modules. These locks have the same structure as the lock 26b seen in FIG. 2 and are self-latched by the latching mechanism inside the module as previously described. While docked in this manner, the gate of Module No. 3 adjacent to tank wall 42 is opened (i.e., lowered) so that movement of the corresponding tool sub-base bearing frame (i.e., the bearing frame sitting on the top surface of Module No. 3) onto the tank is not blocked.

Figure 7:
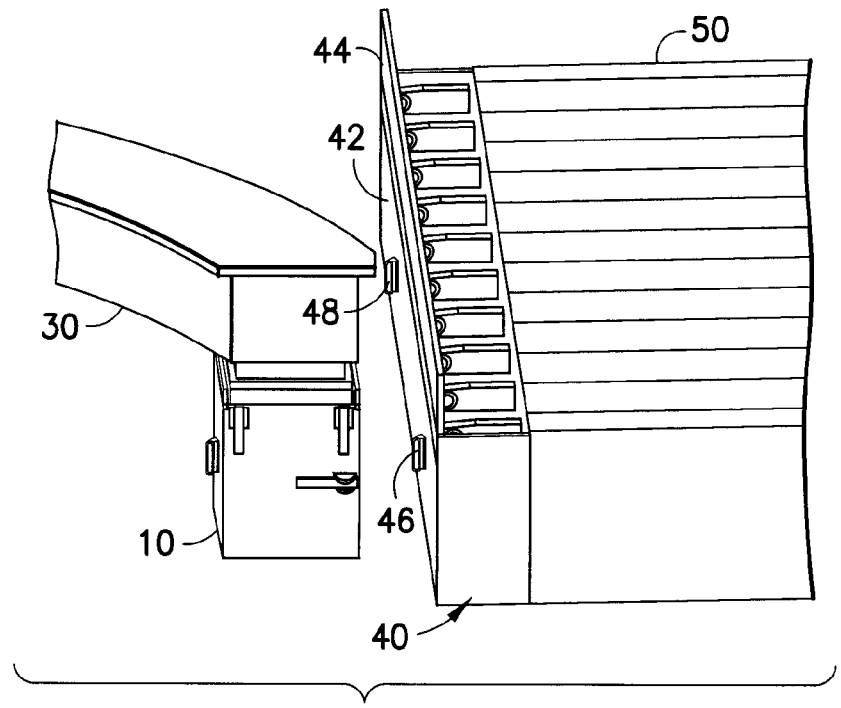
FIG. 7 is a diagram showing an isometric view of a portion of a tool sub-base supported at an elevation by three (only one is shown) mobile support modules of the type depicted in FIGS. 1 and 2, the tool sub-base being shown in a position next to a structural tank (lid open) that separates the tool sub-base from a machine bed.

As seen in FIG. 7, the structural tank 40 has a lid 40 which is closed to allow the tool sub-base 30 to be moved off of the top surface of Module No. 3 and onto the machine bed 50. The tank lid 44 may be constructed to retro-fit or modify an existing tank design. The lid 44 is hinged and may be manually operated. In the lid closed position, the surface of tank lid 44 is substantially coplanar with the top surface of the machine bed 50.

In accordance with one embodiment, the air bearings under the tool sub-base can be activated simultaneously after the first module has been docked at the structural tank. Alternatively, the air bearings under the tool sub-base can be activated in sequence. One example of the latter implementation will now be described.

Referring again to FIG. 6B, after Module No. 3 has been docked at the tank wall 42, the leading gate of Module No. 3 is lowered. Then pressurized air is supplied to the tool sub-base air bearing overlying the top surface of Module No. 3, while the tool sub-base air bearings overlying the top surfaces of Modules Nos. 1 and 2 remain deflated. While Module No. 3 remains docked at the tank wall 42, Modules Nos. 1 and 2 are moved toward the machine bed 50 until Module No. 2 is adjacent to wall 42 of the structural tank 40. Because the tool sub-base air bearings overlying the top surfaces of Modules Nos. 1 and 2 are deflated, there is friction between the corresponding bearing frames of the tool sub-base 30 which are in contact with the top surfaces of Modules Nos. 1 and 2. The tool sub-base 30 is thus carried and moved as Modules Nos. 1 and 2 are moved. During this second movement, the portion of the tool sub-base 30 which is disposed forward of Module No. 2 is moved (without friction) to a position whereat a trailing portion thereof overlies the tank lid 44 while a leading portion overlies the machine bed 50. (This position is not shown in the drawings). To reach this position, the inflated air bearing overlying Module No. 3 first undergoes a smooth transition (without friction) from the top surface of Module No. 3 onto the tank lid 44 (crossing the top surface of the lowered gate of Module No. 3) and then moves smoothly onto the machine bed 50. A drop-down guide (not shown in the drawings) may be used to guide the tool sub-base 30 in a T-slot down the machine bed 50.

After this second movement, Module No. 2 is securely latched or otherwise attached to wall 42 of the structural tank 40, as seen in FIG. 6B. While docked in this manner, the gate of Module No. 2 adjacent to tank wall 42 is lowered so that movement of the corresponding tool sub-base bearing frame (i.e., the bearing frame sitting on the top surface of Module No. 2) onto tank lid 44 is not blocked. At this stage, the tool sub-base air bearing overlying the top surface of Module No. 2 is inflated, while the tool sub-base air bearing overlying the top surface of Module No. 1 remains deflated and the tool sub-base air bearing which initially overlaid the top surface of Module No. 3 (and is now on the machine bed) remains inflated.

Next, while Module No. 2 remains docked at the tank wall 42, Module No. 1 is moved further toward machine bed 50 until it reaches a position adjacent to docked Module No. 3 (as shown in FIG. 6B). Because the tool sub-base air bearing overlying the top surface of Module No. 1 is deflated, there is friction between the corresponding bearing frame of the tool sub-base 30 which is in contact with the top surface of Module No. 1. The tool sub-base 30 is thus carried and moved further onto the machine bed 50 as Module No. 1 is moved. During this third movement, a further portion of the tool sub-base 30 is moved (without friction) onto the machine bed by way of the tank lid. (Again, this position is not shown in the drawings). To reach this position, the inflated air bearing overlying Module No. 2 first undergoes a smooth transition (with negligible friction) from the top surface of Module No. 2 onto the tank lid 44 (crossing the top surface of the lowered gate of Module No. 2) and then moves smoothly onto the machine bed 50.

After this third movement, Module No. 1 is securely latched or otherwise attached to docked Module No. 3, as seen in FIG. 6B. While docked in this manner, the leading gate of Module No. 1 adjacent to Module No. 3 as well as the trailing gate of Module No. 3 which is adjacent to Module No. 1 are lowered so that movement of the corresponding tool sub-base bearing frame (i.e., the bearing frame sitting on the top surface of Module No. 1) onto the top surface of Module No. 3 is not blocked. At this stage, the tool sub-base air bearing overlying the top surface of Module No. 1 is inflated and the other tool sub-base air bearings remain inflated.

Figure 8:
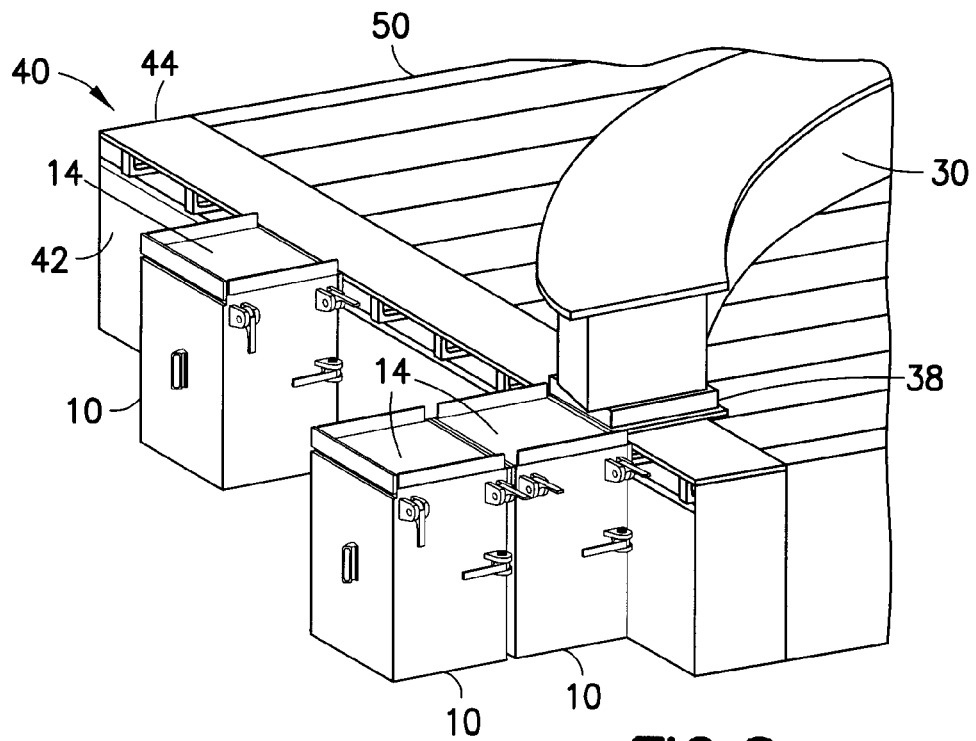
FIG. 8 is a diagram showing an isometric view of the system depicted in FIG. 7 at a time after the tool sub-base has been partly transferred from the mobile support modules onto the machine bed, a portion of tool sub-base being supported by the structural tank with tank lid closed.

With all of the air bearings underlying the tool sub-base 30 in an inflated state, the operator can now push tool sub-base 30 onto the machine bed 50 (to the final position depicted in FIG. 6B) by crossing the tank lid 44. During this fourth movement, the inflated air bearing overlying docked Module No. 1 first undergoes a smooth transition (with no friction) from the top surface of Module No. 1 onto the top surface of Module No. 3 (crossing the top surfaces of one lowered gate of Module No. 1 and one lowered gate of Module No. 3); then undergoes a smooth transition from the top surface of Module No. 3 onto the tank lid 44 (as shown in FIG. 8) (crossing the top surface of the previously lowered gate of Module No. 3); and finally undergoes a smooth transition from the tank lid 44 to the machine bed 50. During this fourth movement, the top surface of Module No. 3 acts as a bridge between the top surface of Module No. 1 and the top surface of tank lid 44. (Another guide may be used to guide the tool sub-base 30 across the machine bed.) The tool sub-base 30 is moved to a stop at the far end of the machine bed 50 and the air to its air bearings is shut off. The supply of pressurized air to the air bearings of Modules Nos. 1, 2 and 3 may be shut off any time after the tool sub-base has been fully unloaded from the modules.

FIG. 8 shows an isometric view of the system depicted in FIG. 7 at a time after the tool sub-base 30 has been partly transferred from the mobile support modules 10 onto the machine bed 50, an air bearing frame 38 being supported by the closed tank lid 44. As seen in FIG. 8, the leading gates of the three modules 10 are each lowered, as is the trailing gate of the forward module of the two modules which are latched together. The lowering of these gates facilitated the smooth transition of the air bearings of tool sub-base 30 from the module support surfaces to the machine bed, in part because they no longer block displacement and in part because the top surfaces of the lowered gates have surfaces against which the air cushions can impinge.

To unload the tooling assembly from the machine bed, the foregoing steps are simply reversed.

Figure 9A:
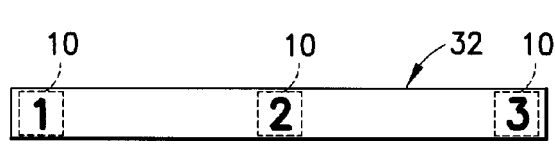
FIGS. 9A and 9B are diagrams showing the initial and final positions respectively of three mobile support modules. In their initial positions (FIG. 9A), the modules fully support a straight tool sub-base. In their final positions (FIG. 6B), the modules are docked and no longer support the tool sub-base, which has been moved onto a machine bed.
Figure 9B:
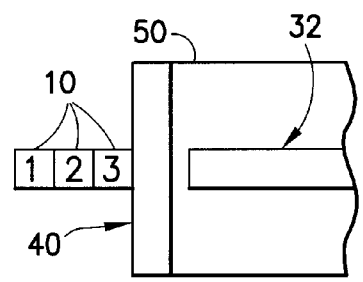

FIGS. 9A and 9B show the initial and final positions respectively of three mobile support modules 10 which can be used to load straight tooling 32 onto the machine bed 50. In their initial positions (FIG. 9A), the modules fully support the straight tooling 32. In their final positions (FIG. 6B), the modules are docked and no longer support the straight tooling 32, which has been moved onto machine bed 50. The loading operations are similarly to those previously described with reference to FIGS. 6A and 6B. First, the tooling 32 is moved toward the machine bed until Module No. 3 is adjacent to the structural tank 40. Then Module No. 3 is latched to the wall of tank 40 and its leading gate is opened. Thereafter, the tooling 32 is moved again until Module No. 2 is adjacent to docked Module No. 3. Module No. 2 is latched to Module No. 3 and the trailing gate of Module No. 3 and the leading gate of Module No. 2 are opened. Thereafter, the tooling 32 is moved again until Module No. 1 is adjacent to docked Module No. 2. Module No. 1 is then latched to Module No. 1 and the trailing gate of Module No. 2 and the leading gate of Module No. 1 are opened. The trailing portion of tooling 32 can then be moved onto the machine bed 50 by crossing the tank lid 40.

FIG. 10 shows a tooling 34 supported by a plurality of stacks 28 of mobile support modules 10 in accordance with a further embodiment. In this example, each stack 28 comprises two modules 10 of the height. Alternatively, each stack could have more than two modules of the same height. Preferably all of the modules are identical in construction to facilitate their interchangeability. During movement of the entire assembly, only the air bearings of the modules situated at the bottom of each stack are inflated. The modules stacked on top of the bottom modules remain deflated throughout the loading and unloading operations.

While the invention has been described with reference to various embodiments, it will be understood by those skilled in the art that various changes may be made and equivalents may be substituted for elements thereof without departing from the scope of the invention. In addition, many modifications may be made to adapt a particular situation to the teachings of the invention without departing from the essential scope thereof. Therefore it is intended that the invention not be limited to the particular embodiment disclosed as the best mode contemplated for carrying out this invention. For example, modules can be anchored to the floor instead of being docked at a wall or at an adjacent module when module movement is to be avoided. Also, the disclosed system could utilize ball bearings instead of air bearing provided that, when necessary, means could be activated to prevent a ball bearing-supported module or object from moving.

The method claims set forth hereinafter should not be construed to require that all steps of the method be performed in the order in which they are recited.

The invention claimed is:

1. A method for moving an object having a plurality of air bearings on a bottom portion thereof onto an object support structure stationed on a floor, the object support structure being built to support the object at an elevation higher than the floor elevation, the method comprising:

(a) placing a plurality of mobile support modules or a plurality of stacks of mobile support modules on the floor, each mobile support module comprising an air bearing on a bottom portion thereof;

(b) arranging the object and the mobile support modules so that the object sits on top of and is fully supported by the plurality of mobile support modules, the heights of the mobile support modules or stacks thereof being such that the object is supported at an elevation whereat the bottom portion of the object is generally vertically aligned with a support surface of the object support structure, and the mobile support modules being positioned underneath the air bearings on the bottom portion of the object;

(c) moving the plurality of mobile support modules along the floor until a first mobile support module is adjacent to a first portion of the object support structure;

(d) latching the first mobile support module to the object support structure;

(e) activating a first air bearing on the bottom portion of the object that has the first mobile support module underneath it; and (f) moving the mobile support modules which are not adjacent to the object support structure further along the floor until a second mobile support module is adjacent to a second portion of the object support structure or is adjacent to the first mobile support module, the first air bearing on the bottom portion of the object being moved onto the object support structure as the object is moved along with the further moved mobile support modules.

2. The method as recited in claim 1, in the case wherein the second mobile support module is adjacent to the second portion of the object support structure, further comprising:
(g) latching the second mobile support module to the second portion of the object support structure;
(h) activating a second air bearing on the bottom portion of the object that has the second mobile support module underneath it; and
(i) after steps (a) through (h) have been performed, moving the still unlatched mobile support modules further along the floor until a third mobile support module is adjacent to the first mobile support module, the second air bearing on the bottom portion of the object being moved onto the object support structure as the object is moved together with the still unlatched mobile support modules.

3. The method as recited in claim 2, further comprising:
(j) latching the third mobile support module to the first mobile support module;
(k) activating a third air bearing on the bottom portion of the object that has the third mobile support module underneath it; and
(l) after steps (a) through (k) have been performed, moving the object further onto the object support structure, during which further movement the third air bearing moves onto the object support structure by way of the bridge formed by the first mobile support module.

4. The method as recited in claim 1, in the case wherein the second mobile support module is adjacent to the first mobile support module, further comprising:
(g) latching the second mobile support module to the first mobile support module;
(h) activating a second air bearing on the bottom portion of the object that has the second mobile support module underneath it; and
(i) after steps (a) through (h) have been performed, moving the object further onto the object support structure, during which further movement the second air bearing moves onto the object support structure by way of the bridge formed by the first mobile support module.

5. The method as recited in claim 4, wherein during step (i) the object and a third mobile support module move together until the third mobile support module reaches a position adjacent to the second mobile support module, further comprising:
(j) latching the third mobile support module to the second mobile support module;
(k) activating a third air bearing on the bottom portion of the object that has the third mobile support module underneath it; and
(l) after steps (a) through (k) have been performed, moving the object further onto the object support structure, during which further movement the third air bearing moves onto the object support structure by way of the bridge formed by the first and second mobile support modules.

6. The method as recited in claim 1, wherein the object is supported by stacks of mobile support modules, and during step (c) the air bearing of the bottom module in each stack is activated while the air bearings of modules above the bottom modules are de-activated.

7. The method as recited in claim 1, wherein the object support structure comprises a bed of a milling machine and the object comprises tooling for supporting material to be milled.

* * * * *